Figure 1:
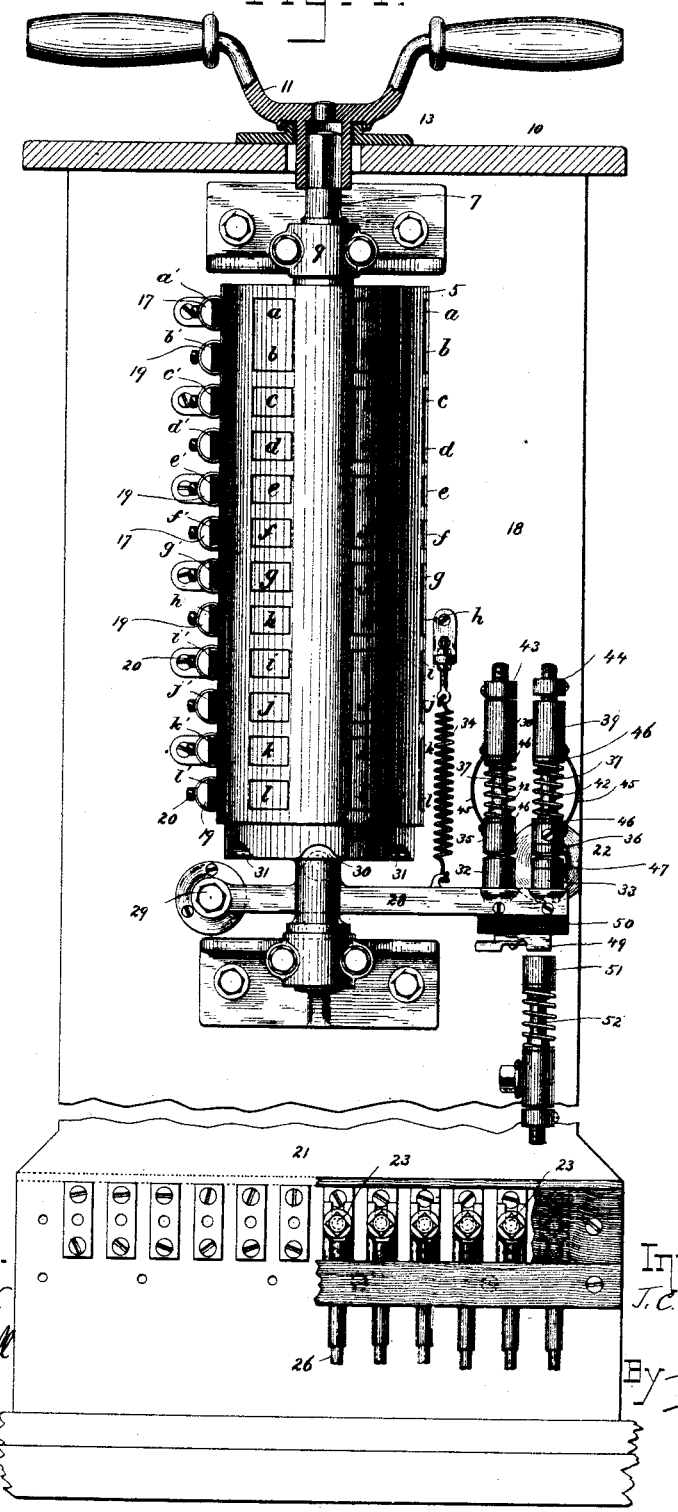

(No Model.) 6 Sheets—Sheet 1.
J. C. CHAMBERLAIN.
CURRENT CONTROLLING DEVICE FOR ELECTRIC RAILWAY CARS.
No. 447,230. Patented Feb. 24, 1891.

Witnesses.
John F. Nelson.
George S. Bell

Inventor.
J. C. Chamberlain
By Knight Bros
Attys (No Model.)
6 Sheets—Sheet 2.
J. C. CHAMBERLAIN.
CURRENT CONTROLLING DEVICE FOR ELECTRIC RAILWAY CARS.
No. 447,230. Patented Feb. 24, 1891.
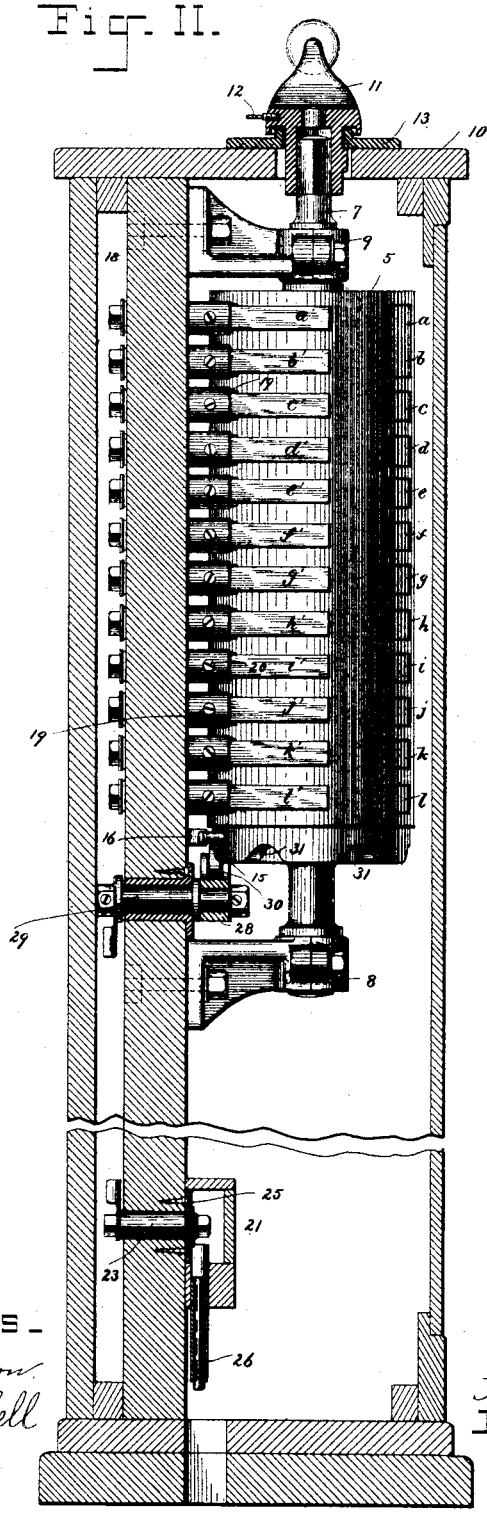
Fig. II.
Witnesses_
John F. Nelson
George S. Bell
Inventor_
J. C. Chamberlain
By Knight Bros
Attys.

(No Model.)  6 Sheets—Sheet 3.
J. C. CHAMBERLAIN.
CURRENT CONTROLLING DEVICE FOR ELECTRIC RAILWAY CARS.
No. 447,230. Patented Feb. 24, 1891.
Fig. III.
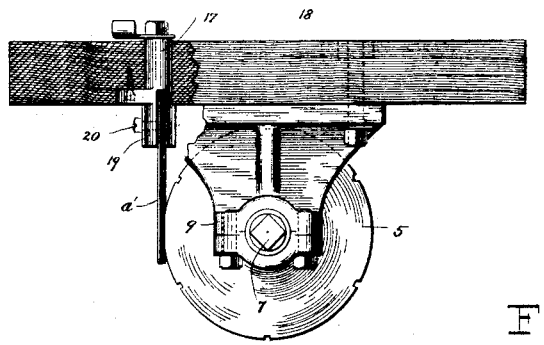
Fig. IV.
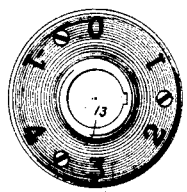
Fig. IX.
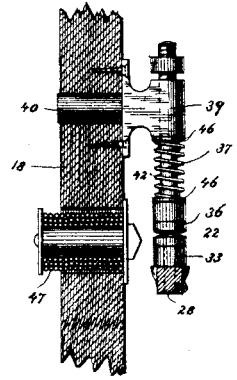
Fig. VIII.
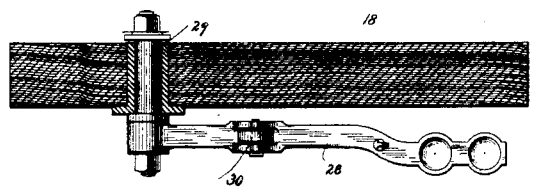
Witnesses.
John F. Nelson
George S. Bell
Inventor.
J. C. Chamberlain
By
Attys.

(No Model.) 6 Sheets—Sheet 4.
J. C. CHAMBERLAIN.
CURRENT CONTROLLING DEVICE FOR ELECTRIC RAILWAY CARS.
No. 447,230. Patented Feb. 24, 1891.
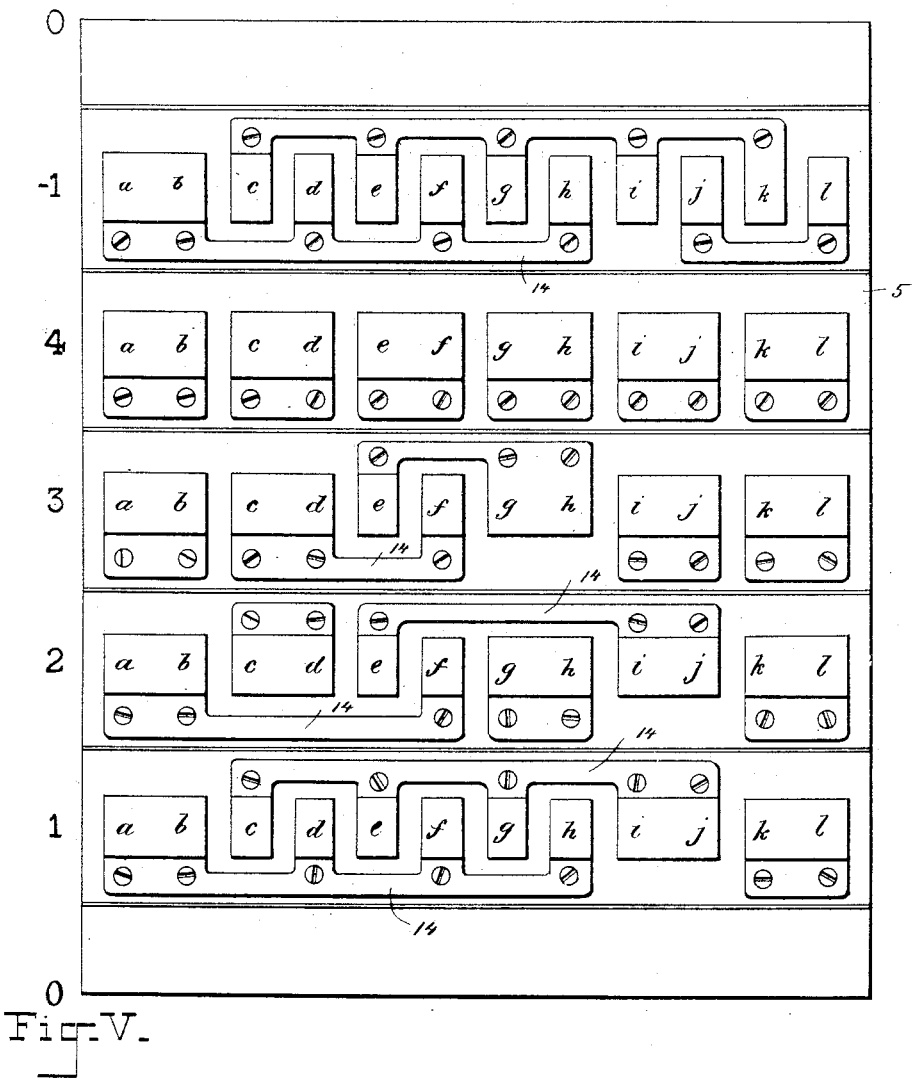
Fig. V.
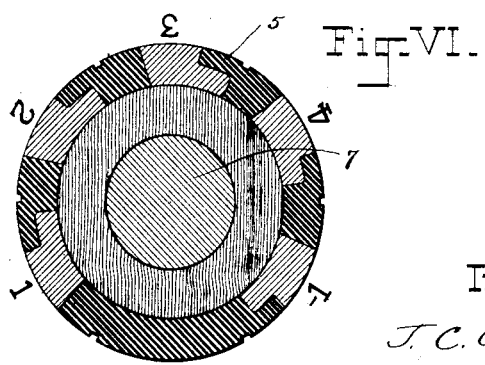
Fig. VI.
Witnesses.
John F. Nelson
Mazie V. Bidgood
Inventor.
J. C. Chamberlain
By Knight Bros
Attys.

(No Model.)  6 Sheets—Sheet 5.
J. C. CHAMBERLAIN.
CURRENT CONTROLLING DEVICE FOR ELECTRIC RAILWAY CARS.
No. 447,230.  Patented Feb. 24, 1891.
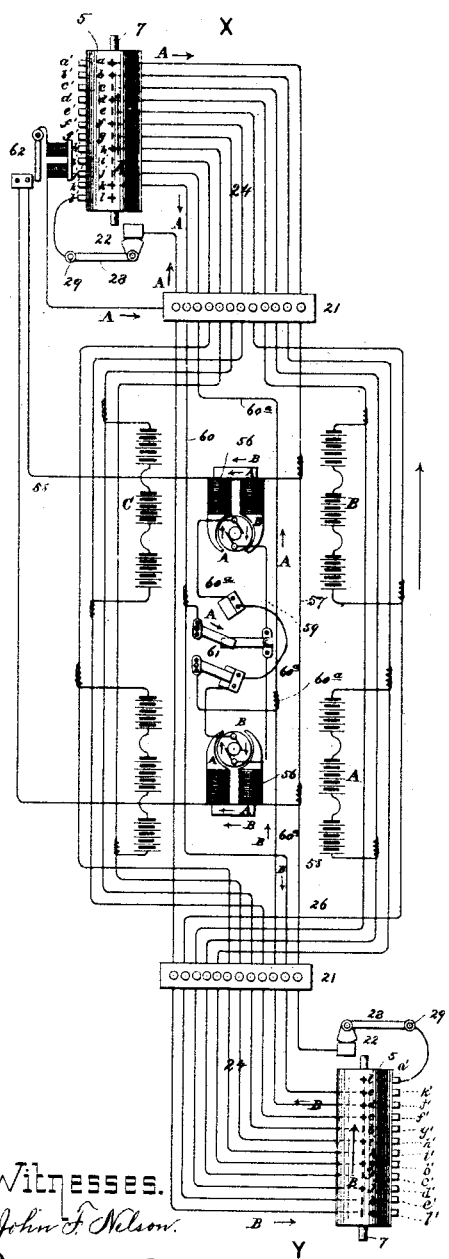
Fig. XI.
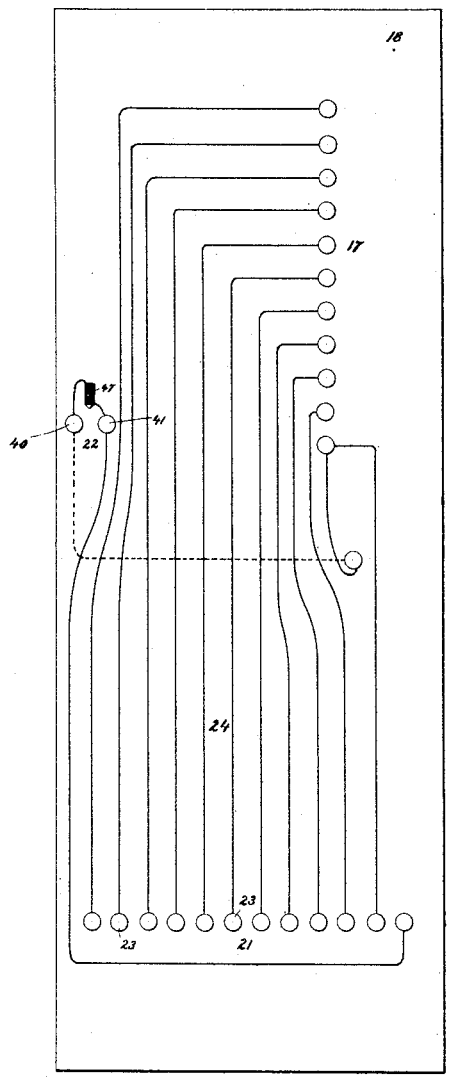
Fig. VII.
Witnesses.
John F. Nelson
Mazie V. Bidgood
Inventor.
J. C. Chamberlain
By Knight Bro
Att'ys.

(No Model.) 6 Sheets—Sheet 6.
J. C. CHAMBERLAIN.
CURRENT CONTROLLING DEVICE FOR ELECTRIC RAILWAY CARS.
No. 447,230. Patented Feb. 24, 1891.
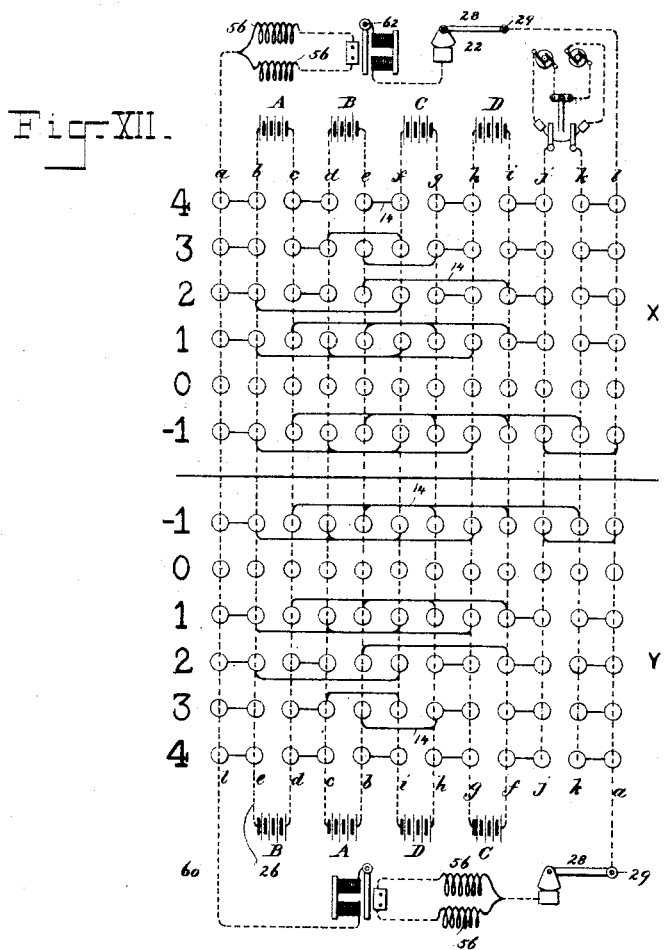
Fig. XII.
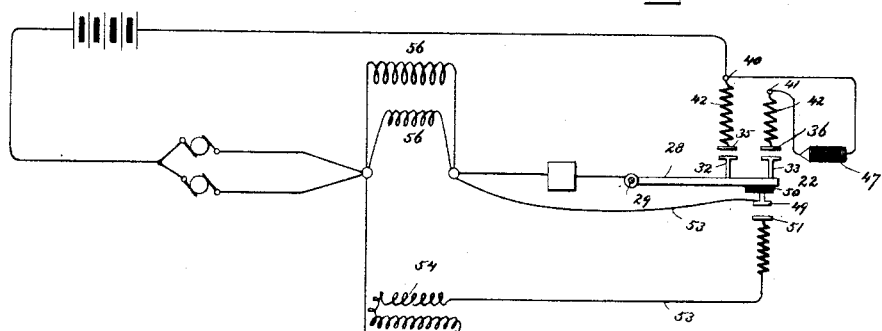
Fig. X.
Witnesses.
John F. Nelson
George S. Bell
Inventor.
J. C. Chamberlain
By Knight Bros
Att'ys.

UNITED STATES PATENT OFFICE.

JACOB C. CHAMBERLAIN, OF NEW YORK, N. Y.

CURRENT-CONTROLLING DEVICE FOR ELECTRIC-RAILWAY CARS.

SPECIFICATION forming part of Letters Patent No. 447,230, dated February 24, 1891.

Application filed September 9, 1889. Serial No. 323,345. (No model.)

*To all whom it may concern:*

Be it known that I, JACOB CHESTER CHAMBERLAIN, a citizen of the United States, residing at New York, in the county and State of New York, have invented certain new and useful Improvements in Current Regulating or Controlling Devices for Electric-Railway Cars, of which the following is a specification.

My invention is a "current-regulator" intended especially for those electric-railway cars which are propelled by a self-contained source of electricity. The usual source of energy in such cars is a number of groups of secondary batteries mounted in convenient location on the car-body. Each group has its elements connected up in fixed series relation to one another, and is carried by one or more trays or drawers movable independently of all of the other groups. When placed upon the car, the several groups of batteries are independently in circuit with the electric motor or motors thereof through the medium of a regulating device, whereby their series relation to each other may be varied, according to the load carried by or speed required of the car.

The present invention consists in certain improvements in and connected with this regulating device, as will be hereinafter more fully described.

Referring to the accompanying drawings, which form a part of this specification, Figure I is a front view of the regulator, showing parts forming part of my invention. Fig. II is a side elevation of the same, partly in section. Fig. III is a plan view thereof, partly in section. Fig. IV is a top view of the dial-plate. Fig. V is a plane projection of the regulator-cylinder. Fig. VI is a horizontal sectional view thereof. Fig. VII is a diagrammatic view showing the wiring of the regulator. Fig. VIII is a horizontal sectional view through the pivot of the circuit-breaking lever. Fig. IX is a vertical sectional view of the circuit-breaker. Fig. X is a diagrammatic view of the electric circuit including the circuit-breaker. Fig. XI is a diagrammatic view of the several electric circuits on the car, those from the batteries and motor to the regulator being specially in detail. Fig. XII is another diagrammatic view of the circuit upon the car, showing in detail the connections of the contacts on the regulator-cylinder.

In Figs. I to VI the details of the regulator are shown. It consists of a cylinder 5 of suitable insulating material, such as ebonite. In this cylinder are set six vertical series of contact plates or blocks. The several series are for convenience in practice marked 1 0 1 2 3 4. The cylinder is carried by a shaft 7, which seats at its lower end in a bracket 8, is journaled above the cylinder in a bracket 9, and projects at top through the top of a casing 10, containing the regulator. At its upper end the shaft is squared to receive a corresponding socket of a handle 11, adapted to be manipulated by the motorneer. On the handle is an index 12, which as the handle and cylinder are turned moves over a dial-plate 13, suitably marked (see Fig. IV) to indicate to the motorneer the positions of the contacts of the cylinder. For a car having four groups of batteries each line of contacts contains twelve contact plates or points marked *a b c d e f g h i j k l.*

In Fig. VI have shown how the several contact-plates are insulated from or connected up with others of the same series. So far as the contacts connecting with the batteries are concerned, their arrangement is, as shown in Figs. V and XII, such that one series 0 opens the circuit of the batteries, the next 1 connects all four up in multiple arc, the next 2 groups them in series of two batteries each, the next 3 groups two in series with each other and with the two other in multiple arc, and the next 4 groups all in series. In addition to these connections I provide the line of contacts −1, which couples up the batteries just as does series 1, but connects them to the reverse end of the motor-armature. This line of contacts is brought into play when it is desired to suddenly reverse the motor without going to the other end of the car or shifting the reversing-switch.

The sectional view, Fig. VI, shows the method of setting the contact plates or blocks in the cylinder and uniting them by connecting strips or bars 14.

To avoid excessive sparking and heating, it is important that the regulator be not turned too suddenly from position 4 to position 0 or −1. Accordingly a stud 15 on the base of the cylinder is arranged to impinge on a stop 16, carried by the case of the regulator when the regulator is at points −1 or 4, so that the cylinder cannot pass from −1 to 4 or from 4 to −1 without passing through all of the intermediate positions so that the variation of electro-motive power may be gradual.

Connection of the regulator-contacts with the circuit is by way of a number of brushes $a'$ $b'$ $c'$ $d'$ $e'$ $f'$ $g'$ $h'$ $i'$ $j'$ $k'$ $l'$ of conducting substance, such as copper. These brushes bear in a vertical line on the periphery of the cylinder.

Figs. II and III best show the method of mounting these brushes. They are socketed on split metal posts 17, passing through and fixed to the false back 18 of the casing 10. Ferrules 19, slipped over posts 17, prevent the spreading or splitting of the latter and shifting endwise of the brushes when they are tightened therein by set-screws 20. A perfect contact between the brushes and their supporting-posts may therefore be obtained, and the brushes are at all times held in proper horizontal position against the surface of the cylinder.

Fig. VII shows the wiring of the rear board 18 to connect the several posts 17 with junction-box 21, wherefrom wires run to the batteries, motors, &c. The connection will be seen to be without crossing of wires and in every case direct except one, in which the circuit passes by way of the circuit-breaker 22, to be presently described. The junction-box is arranged across the lower part of board 18. It has a series of posts 23, corresponding in number to the brushes $a'$ to $l'$, and connected therewith by wires 24. At front the post bears contact-plates 25, whereto are clamped the terminals of insulated wires 26, which pass through holes in a strip forming the bottom of the junction-box. The wiring of the regulators at both end platforms of the car is identical; but the connections from the junction-boxes to the motors and batteries vary, as will be hereinafter pointed out.

Referring to Figs. I, II, VIII, and IX, 28 is a lever pivoted to a post 29, fixed to board 18, and connecting with the wire 24 of end brush $l'$. At 30 the lever carries a cam or roller, which is engaged by cams 31 on the lower end of the cylinder and is depressed momentarily whenever the cylinder is turned. The outer end of the lever carries the changeable contacts 32 33. These impinge, under the action of strong spring 34, upon two contact-blocks 35 36, carried by rods 37, which slide in sleeves 38 39. These sleeves are fixed to board 18, and have posts 40 41 extending through the same. Springs 42 42, placed between blocks 35 36 and sleeves 38 39, force the former down when they are freed by the pressing down of lever 28. The upper ends of rods 37 are screw-threaded to receive nuts 43 44, which are so adjusted that as the lever 28 descends its contact 32 will first separate from contact 35, the latter being arrested by the striking of its nut 43 on sleeve 38. Consequently there is no sparking between blocks 32 and 35, which remain constantly clean and insure a good contact. All sparking occurs between blocks 33 36, which separate later and contact earlier than the blocks 32 35. The sliding movement of both contacts 35 36 insures that the blocks 32 33 will always seat against both. To insure electrical connection of blocks 35 36 with sleeves 38 39, I provide flexible conductors 45 45, uniting the two. The fiber collars 46, interposed at top and bottom of springs 42, cut the latter out of the path of the current. I have shown two pairs of contacts 32 35 and 33 36; but the number of pairs may be increased at will.

Although the spark is deprived largely of its ill effects by the employment of the separate contact-points just described, it sometimes happens that the spark will be so far prolonged between the points 33 36 that the circuit remains unbroken until after the brushes $a'$ to $l'$ have left their contact-plates, causing injurious sparking at the cylinder. This difficulty I overcome by lengthening the contacts $a'$ to $l'$ and by shortening the duration of the spark between contacts 33 36.

47 is an electro-magnet wound with fine wire and having one pole adjacent to the separating-point of contacts 33 36. Its wire ends 48 are connected to posts 40 41, respectively.

Referring now to the diagrammatic view, Fig. X, it will be seen that when lever 28 descends and breaks the contact 32 35 the current will pass for an instant around magnet 47 to post 41, thence to sleeve 39, contacts 36 33, and so to the lever 28, as before; but as the lever continues its descent and separates the contacts 36 33 the magnet 47, which has been and continues strongly magnetized so long as the current flows, will blow the spark out and rupture the circuit. To further lessen the spark I add still another device, whereby the residual magnetism of the motor field-magnets, which are responsible for most of the sparking, is shunted into a resistance when the main circuit is broken.

Referring to Figs. I and X, 49 is a contact button or block fixed to the under side of lever 28, but electrically insulated therefrom by fiber or equivalent strip 50. 51 is another contact carried by sliding spring-rod 52 in manner substantially similar to contacts 35 36. This contact is so adjusted that the block 49 will impinge thereon before the contacts 33 36 separate. The contacts 49 51 have insulated connection 53 with opposite poles of the motor field-magnets and with a high-resistance helix 54. Thus when contacts 33 36 separate, the contact at 49 51 having already been established, the discharge of the fixed magnets expends itself on the helix 54, which may be suspended under the car in some place where the air will circulate freely around it.

Having now described certain of the de- tails of my invention, I will set forth with reference to the diagrammatic views, Figs. XI and XII, their arrangement on a tram-car having two motors.

A B C D are four groups of batteries arranged suitably on the car and having independent connection by wires 26 with the junction-boxes 21, and so with the contact-brushes of the regulators at both ends of the car. The field-magnets 56 of the car-motors are joined in parallel by wires 57 and have connection by wires 58 with both regulators independently of the armatures. The motor-armatures are also joined in parallel by wires 59 and connected to both regulators by wires 60 60$^a$. A current-reversing switch 61 is arranged in the circuit for extraordinary use. All ordinary reversing is done by the regulators.

At 62 is an automatic cut-out arranged, in a manner which will be readily understood, to cut out the translating devices when too heavy a current is flowing on the line.

I will now describe the course of the current when the car is operated from either end. Supposing that the car is to be driven toward the arrow, Fig. XI, the regulator at the end marked X will be used, the one at the other end (marked Y) being set at position 0 and consequently out of circuit. The regulator at X being turned to position 1, the current will flow as indicated by arrow A. Passing through the batteries in parallel, it will, owing to the contact-connections, as clearly shown in Fig. XII, pass from contacts $b\ d\ f\ h$ to contact $a$, thence by brush $a'$ around field-magnets 56 of the motors, through automatic cut-out 62 to circuit-breaker 22, thence to brush $l'$, contact $l$, contact $k$, brush $k'$, wire 60 to circuit-changer 61, through the armatures in parallel in the direction of arrow A, by wire 60$^a$, back to brush $j'$ at X, and so to contacts $i\ g\ e\ c$, connected with the negative poles of the batteries. If now the car, having reached the end of its trip, is about to return, the regulator just operated at the end X is cut out by turning it to point 0, and the regulator at the other end is used on the return. The course of the current is now shown by arrows B, and by tracing it out it will be found that the current passes in the reverse way through the regulator—viz., from top to bottom—and in a reverse way through the motor-armature—viz., from right to left—while it passes through the field-magnets in the same direction as before. Thus supposing the regulator Y to be turned to position 1, the current passes from battery-terminals $d'\ b'\ h'\ f'$ to contact $j$, terminal $j'$, thence through the armature-coils (in the opposite direction to the corresponding current from X) to $k$, then from $a$ to field-magnets in the same direction, as before described, to terminal $l'$, contact $l$, and the negative poles of the batteries. I thus have with a precisely-identical construction and wiring of the two regulators an opposite effect on the circuit controlled by them.

By turning either regulator further to points 2, 3, and 4 the number of volts of current is increased at will, as already described.

It has been seen that when the regulator is at step 3 two of the batteries are grouped in series and two in multiple arc, while the two groups are in series. Thus two of the batteries will, so long as the regulator rests at this step, be supplying double the current of the other two. To even up this I arrange to have this grouping reversed in the two regulators, so that the two batteries which were on the "down" trip in parallel at the third trip may on the "up" trip be in series, and vice versa. Thus, referring to Fig. XII, when the regulator X is operated at step 3 the batteries C B are in parallel, while batteries A D are in series therewith and with each other, so that the latter will be discharging twice the current of the former; but at the return-trip regulator Y is operated, and at the third step the batteries A D are in parallel, while the remaining batteries B C are in series therewith and with each other. This difference is effected not by changing the construction of the regulator, but simply varying the connections of the batteries with the junction-boxes. In addition to this reversing action possessed by the two regulators it is desirable that in emergency the current may be reversed without leaving the (for the time being) front platform of the car. When so reversed, the motor acts as an efficient brake. I accomplish this without the use of a separate reversing-switch simply by a modification of the regulator. An additional line of contacts −1, already pointed out, is used on each regulator-cylinder. By an inspection of the diagram, Fig. X, it will be seen that of these contacts all connections are the same as in position 1, with the exception that the positive poles of the batteries are connected to opposite sides of the motor-armatures in the two cases, so that by turning the regulator from 1 to −1 the motor is reversed and the vehicle stopped or even reversed. By simply altering the wiring the described regulator may be made to vary the number of motor field-magnets in series relation with the same result as is produced by varying the number of batteries in series.

I do not herein claim a cylinder or regulator for groups of batteries having, in combination with contact plates or blocks for each group, separate contacts for the field magnets and armatures and suitable contact-plates, the said contact plates or blocks for the batteries and the said contacts for the field magnets and armature being all mechanically connected to move together; nor the combination, in an electric circuit of batteries or groups of batteries, an electric motor, and a cylinder or regulator having a plurality of series of contacts, each series containing contacts for the terminals of each battery or group of batteries, of the motor field-magnets and the motor-armature, and the several series being connected up in various ways, all of said contacts being operatively connected to move together, inasmuch as the same is claimed in my co-pending application, Serial No. 352,197, filed May 17, 1890, which is a division of this case.

In my application, Serial No. 352,197, I have also shown and described the arrangement whereby separate regulators on opposite ends of a car are oppositely connected to the motor-armature, and I therefore do not claim the same herein, as I reserve the same for said application.

Having thus described my invention, the following is what I claim as new therein and desire to secure by Letters Patent:

1. The combination, with an electric circuit, of groups of batteries, a motor, and a regulator having series of contacts for changing the grouping of said batteries and, co-operating therewith, separate series of contacts adapted to connect said batteries with opposite poles of said motor, all of said contacts being mechanically connected, so as to move together, substantially as set forth.

2. The combination, in an electric circuit, of batteries or groups of batteries, an electric motor, and a regulator having a plurality of series of contacts, each series containing contacts for the terminals of each battery or group of batteries of the motor field-magnets and of the motor-armature, and such contacts in the different series being differently connected up, so as to connect the batteries to opposite poles of the motor-armature, all of said contacts being operatively connected to move together, substantially as set forth.

3. The combination of regulator cylinder or block 5, having series of contact plates or blocks connected up in various relations, whereby the electro-motive force of a current may be varied by continuous gradations from one polarity to the other, and a stop for arresting said cylinder or block at each extremity of its movements at a point between the extreme gradations, substantially as set forth.

4. In combination with a contact-brush, a post whereon the same is mounted, and a ferrule embracing both post and brush, substantially as set forth.

5. In combination with contact-brushes, posts on which the same are mounted, ferrules or rings surrounding said posts or brushes, and straining or set screws engaging with said posts, ferrules, and brushes, substantially as set forth.

6. In combination with a current-regulator, a circuit-breaker operated thereby, having two or more pairs of contacts arranged in multiple arc with one another and in series with the regulator, and adapted to operate substantially as set forth.

7. In combination with a current-regulator, a circuit-breaker having one member operated by said current-regulator and another member spring-pressed to contact with the first, substantially as set forth.

8. In a circuit-breaker, the combination of two pairs of contacts connected to the same circuit in multiple arc, one contact of each pair being yielding, and means for operating one contact of each pair simultaneously.

9. The combination of positively-movable contact 32, spring-pressed contact 35, and adjustable stop 43, arranged and adapted to operate substantially as set forth.

10. In a circuit-breaker, the combination of two pairs of contacts connected to the same circuit, means for operating one contact of each pair simultaneously, one of said pairs of contacts being yielding and brought into contact before the other.

11. The combination of positively-movable contacts 32 33, spring-pressed contacts 35 36, carried by rods 37, sleeves 38 39, wherein said rods slide, and adjusting-nuts 43 43, substantially as and for the purposes set forth.

12. The combination of contacts 32 35, sliding rod 37, sleeve 38, spring 42, and flexible conductor 45, substantially as and for the purposes set forth.

13. The combination of contacts 32 35, sliding rod 37, sleeve 38, spring 42, and fiber or equivalent collars 46, substantially as and for the purposes set forth.

14. The combination of a current-regulator, a circuit-breaker operated thereby, and an electro-magnet arranged to blow out the spark of said circuit-breaker, substantially as set forth.

15. The combination of the circuit-breaker having two or more pairs of contacts and an electro-magnet arranged with its pole adjacent to the contact-point of one of said pairs and having its helix in a shunt around the other pair of contacts, substantially as set forth.

16. The combination of the circuit-breaker with an electro-magnet for breaking the spark between a pair of contacts connected to the same circuit as the circuit-breaker and having its helix arranged in a shunt around the contacts of the circuit-breaker, substantially as set forth.

17. The combination of a circuit-breaker having two pairs of contacts and an electro-magnet having its pole adjacent to the contact-point of one of said pairs and its helix in circuit with said pair and in shunt around the other pair of contacts, substantially as and for the purposes set forth.

18. The combination of current-regulator having series of contact plates and brushes bearing thereon, a current-breaking lever operated by the movement of said regulator, two contact buttons or blocks carried by said lever, two contact buttons or blocks mounted on fixed supports and adapted to be impinged on successively by the contacts on said lever, and an electro-magnet having its pole adjacent to the contacts which separate later and its helix in shunt around the other contacts, substantially as and for the purposes set forth.

19. In combination with an electric circuit including batteries, a current-regulator, and the field-magnets and armatures of a motor, a high resistance in shunt around said batteries, regulator, and armature, and contacts in said shunt-circuit operated by said regulator, substantially as and for the purposes set forth.

20. The combination of an electric circuit including batteries, a current-regulator, the field-magnet and armature of a motor, and contacts operated by said regulator for breaking said circuit with a shunt-circuit including said field-magnets, a high resistance, and contacts operated by said regulator and adapted to be closed immediately before the contacts of the main circuit are operated, substantially as set forth.

21. The combination of two identical regulators at opposite ends of a car, each regulator having a number of series of contact-plates and a series of brushes adapted to contact therewith, a number of batteries or groups of batteries, an electric motor or motors, and independent connections from the terminals of said batteries and from the motor or motors to said contact-brushes, and the connection being such that batteries placed, respectively, in series and in multiple by the movement of one regulator, so as to be unequally discharged, will be placed in multiple and in series by movement of the other regulator, whereby the current drawn from the several batteries during a trip is equalized, substantially as set forth.

22. The combination, on a car, of a number of batteries or groups of batteries, electric motor for driving said car, and two identical current-regulators on opposite ends of said car, each regulator having a series of brushes in independent connection with the terminals of said batteries and of the motor field-magnets and armature, sets of contact-plates adapted to be brought in contact with said brushes to vary the grouping of the batteries, and an additional set of plates for reversing the connection of the batteries to the motor, substantially as set forth.

23. In combination with the two relatively-movable contact-pieces in an electric circuit, an electro-magnet in proximity thereto normally unexcited, and means whereby the latter is excited at or immediately preceding the rupture of contact, substantially as set forth.

J. C. CHAMBERLAIN.

Witnesses:
HARRY E. KNIGHT,
HERBERT KNIGHT.